June 15, 1954
E. V. BERGSTROM
2,681,269
CONTACTING APPARATUS
Filed March 21, 1951
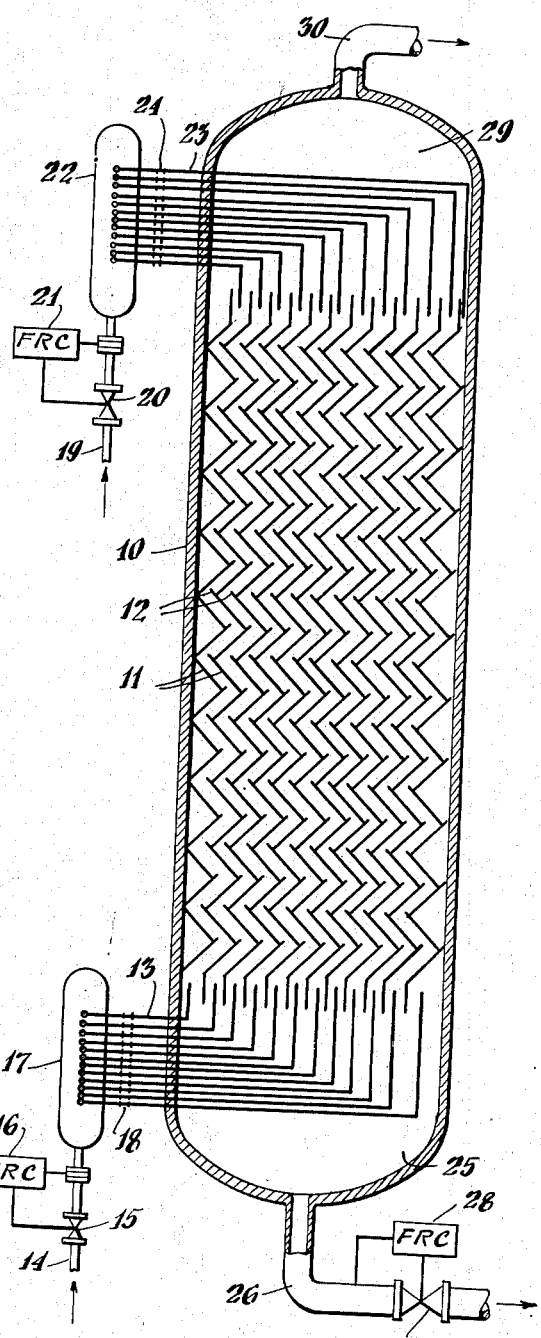
Fig. 1
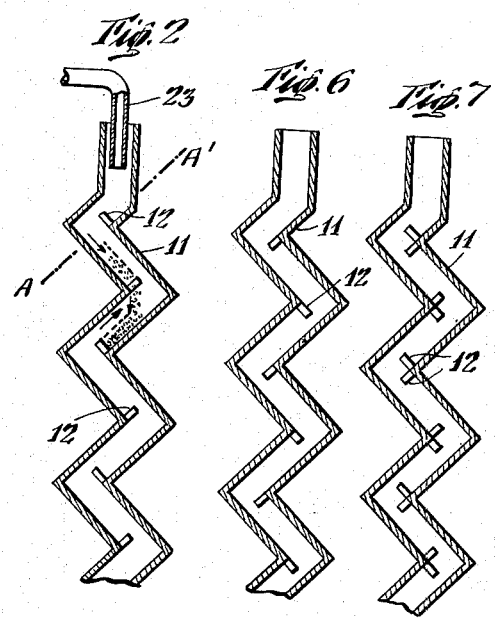
Fig. 2  Fig. 6  Fig. 7
Fig. 3
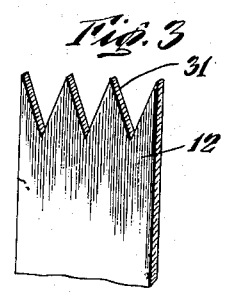
Fig. 4  Fig. 5
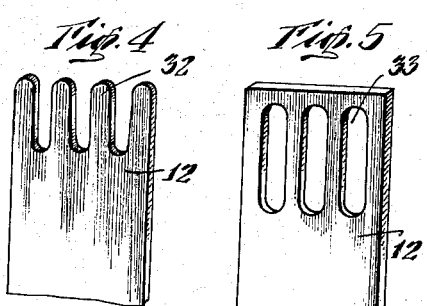
INVENTOR.
Eric V. Bergstrom
BY Raymond W. Barclay
ATTORNEY Patented June 15, 1954

2,681,269

UNITED STATES PATENT OFFICE 2,681,269

CONTACTING APPARATUS

Eric V. Bergstrom, Short Hills, N. J., assignor to Socony-Vacuum Oil Company, Incorporated, a corporation of New York Application March 21, 1951, Serial No. 216,802

3 Claims. (Cl. 23—270.5)

This invention relates to an apparatus for effecting intimate contact of fluids and, more particularly, is directed to an apparatus wherein effective admixture of counter-flowing liquids is obtained without encountering serious channeling.

While the description which follows hereinafter is particularly concerned with the refining of gasoline involving the contacting of untreated gasoline and aqueous caustic solution, it is to be understood that the apparatus of this invention may be employed for contacting other liquids such as in the solvent treatment of lubricating oil fractions, the extraction of deleterious matter from distillate fuel oils, etc. Furthermore, the apparatus described herein may be utilized for effecting intimate admixture of two or more gases or one or more gases with one or more liquids. Accordingly, it is contemplated that the instant apparatus will be found to be useful in contacting fluids generally and particularly valuable in bringing about an intimate degree of contact between liquids treated therewith.

The apparatus of this invention comprises a plurality of zigzag tubes vertically arranged in a column with means for introducing one fluid into the upper ends of said tubes and means for introducing a second fluid into the lower ends of said tubes. Also, one or more fluids may, if desired, be introduced into the zigzag tube at various intermediate points thereof. The tubes are provided with a series of internal serrated edges, at least one of which is positioned at each of the bends or junctures in the tubes. These serrated extensions, which jut into the interior of the tubes at each of the angle bends serve to inter-disperse the counter-flowing fluids passing through the tubes. The fluids, after passage through the contacting zone afforded by the aforesaid zigzag tubes equipped with internal serrations, may be either directly removed from the column through outlet conduits or permitted to occupy settling zones located above and below the plurality of tubes for a predetermined length of time and thereafter be removed from the settling zones through outlets and conducted to storage or to further processing stages.

The zigzag tubes making up the contacting section of the present apparatus are of such length as to effect the desired degree of admixture between the counter-flowing fluids undergoing treatment. The tubes have a relatively small cross-section, which may be of any desired geometrical shape. The pitch of each inclined element of the zigzag tubes is such as to afford a rate of flow through the tubes of sufficient magnitude to effect desired fluid admixture. The particular slope or pitch of each element of the tubes will thus be chosen in accordance with the fluids undergoing treatment. However, as a general matter, the slope of each element of the tube will ordinarily be such as to make an angle of between about 20 and about 60 degrees with the horizontal. The serrated extensions jutting into the interior of the tube at each angle bend or juncture thereof are generally preferably inclined, having the same degree of slope as the tube wall of which they constitute extensions. The serrated extensions are arranged within the tubes in staggered relationship, at least one of said extensions being positioned at each of the angle bends of the tube. In some instances, it may be desirable to have two or more serrated extensions positioned at each of the angle bends in the tubes. The nature of the serrated extensions is such as to effect inter-dispersion of fluids counter-currently passing thereover. It will thus be understood that the terms "serrated" and "serrations" as used in the present specification and claims refer broadly to an extension having an irregularly shaped edge of any geometrical design or pierced with openings of any geometrical configuration, whereby a fluid passing thereover is inter-dispersed with a counter-flowing fluid.

The number of zigzag tubes employed in treating fluids will depend largely on the volume of the fluids passing through the apparatus and to some extent on the nature of the particular fluids. Thus, for admixing gases, the number of zigzag tubes necessary will ordinarily be less than for the treatment of counter-flowing liquids. The individual cross-sectional area of each of the tubes is appreciably less than the cross-sectional area of the column surrounding said tubes so that the streams of fluids introduced into the apparatus are divided into a large number of small streams and pass through the confined zigzag vertical zones under controlled conditions of flow without undue channeling.

While the present invention is, of course, not to be limited by any theory of operation, it is believed that the efficiency of treatment obtained with the above-described apparatus is due to the zigzag path which the fluids flowing therethrough follow and to the inter-dispersion of the counter-flowing fluids passing over the serrated extensions located at each juncture of each of the tubes. It may thus be postulated that as a fluid flows through the tubes of the present apparatus, its direction is alternately reversed in zigzag fashion as it proceeds through the tube and that the speed of flow is reduced at each angle bend of the tube. By having positioned at each of the angle bends one or more serrated extensions, intimate admixture is obtained at this point of decreased fluid flow by the inter-dispersion of counter-flowing fluids upon passage through or over the serrated edges.

Each fluid entering the tubes is preferably metered therein by means of individual conduits so that substantially uniform flow results through each individual tube of the apparatus. As pointed out hereinabove, one fluid will generally be introduced through the upper ends of the tube and a second fluid introduced through the lower ends of the tube. Additional fluids may be introduced into the tubes if desired at various intermediate points along the path of flow. In the treatment of counterflowing liquids, it is generally desirable to have settling zones located in the upper and lower portions of the column, respectively, overlying and underlying the tube section. Each of the settling zones is provided with outlet conduits for withdrawal therethrough of the treated liquids.

The invention may be more readily understood by reference to the attached drawings wherein:

Figure 1 is an elevational view partly in section of the apparatus.

Figure 2 is a detailed elevational view in section of one of the zigzag tubes comprising the contacting section of the apparatus.

Figure 3 is a detailed elevational view in section taken along line AA' of Figure 2 and illustrates a typical serrated extension.

Figures 4 and 5 likewise show serrated extensions in alternate form.

Figures 6 and 7 are elevational views in section of alternate forms of the zigzag tubes.

Referring more particularly to Figure 1, the numeral 10 designates a column. A plurality of zigzag tubes 11 are vertically arranged within colunm 10 and rigidly supported therein by brackets, beams, or other suitable means. A number of serrated extensions 12 are positioned at each angle bend of each of the zigzag tubes. A plurality of feed pipes 13 extends upwardly into the lower opening of the tubes, separate feed pipes being inserted into each of the individual tubes. Fluid conducted into the lower portion of the apparatus is led through conduit 14 furnished with valve 15 and flow responsive control 16. The fluid enters metering device 17 wherein the fluid is divided into a plurality of streams, each of said streams passing through the aforementioned feed pipes 13, each of which is equipped with an orifice 18 aiding in fluid distribution. Likewise, the fluid introduced into the upper portion of the apparatus is conducted through conduit 19 equipped with valve 20 and flow responsive control 21, entering metering device 22 wherein it is separated into a plurality of small streams. The small streams flow through feed pipes 23, each of which is equipped with an orifice 24, aiding in the distribution of fluid passing through said pipes. Each of the feed pipes 23 is inserted into the open ends of individual tubes. Underlying the above-mentioned contacting section, made up of a plurality of zigzag tubes, is a settling zone 25 occupying the lower portion of column 10. An outlet conduit 26 pierces the wall of this settling zone and is provided with valve 27 equipped with flow responsive control 28, which aids in controlling the removal of fluid from the lower portion of the column. Similarly overlying the contacting section of zigzag tubes is a settling zone 29. This settling zone is pierced by an outlet conduit 30.

The serrated extensions 12 are preferably positioned in staggered relationship within the zigzag tube at each of the angle bends thereof. Such arrangement is shown in greater detail by Figure 2. The usual form of the extended serrations will be of a saw-toothed nature such as shown by Figure 3 wherein the extension terminates in a suitable number of pointed teeth 31 which serve to inter-disperse the counterflowing fluids flowing thereover. However, as set forth hereinabove, it is within the purview of this invention to employ any other alternate form of serration which will serve to inter-disperse counter-flowing fluids passing through the tubes. Typical alternate types of serrated extensions are shown in Figures 4 and 5. In Figure 4, the extensions terminates in a number of fingers 32 which serve as the inter-dispersing means. In Figure 5, extension 12 is pierced by a number of openings or slits 33 which likewise behave as dispersing means.

In Figures 6 and 7, alternate positioning of the serrated extensions is shown. In Figure 6, the serrations are inclined downwardly rather than upwardly as shown by Figure 2. It is contemplated that the alternate forms of tubes illustrated by Figures 2 and 6 may be used interchangeably and with equally effective results, the particular choice of tube depending largely on the nature and directional flow of the fluids undergoing treatment. In some instances, it may be desirable to have more than one extended serration positioned at the angle bend of the tubes. One typical type of such structure is shown in Figure 7 wherein two serrated extensions are illustrated, one being in effect an extension of the inclined downward wall of tube 11 and the other being an extension of the upwardly inclined wall of the tube. While ordinarily tubes provided with one serrated extension will be found adequate to sufficiently inter-disperse fluids passing through the tubes, the double serrated tube will be useful in the inter-mixing of more viscous liquids. Likewise, although not generally necessary, the tubes may be provided with more than two serrated extensions. It will thus be understood that the length, cross-section, extent of slope and number of serrations positioned at each angle junction of the tubes will be such as to effect intimate admixture of counter-flowing fluids passing through the tubes.

Typical of the counter-flowing streams processed with the present apparatus are those of untreated gasoline and aqueous caustic solution. In the case of these two liquids having different density, the heavier of the two, namely, aqueous caustic solution, will usually be introduced to the top of the contacting section passing through conduit 19, metering device 22, and feed pipes 23, respectively. The lighter of the two liquids, in this case untreated gasoline, is introduced into the lower portion of the apparatus through conduit 14, metering device 17, and feed pipes 13. Uniform separate streams of the aqueous caustic solution introduced pass downwardly through the zigzag tubes 11, while separate uniform streams of untreated gasoline flow upwardly through the tubes 12. The counterflow of the two liquids in following the confined zigzag path and flowing over the serrated extensions 11 affords intimate admixture. The aqueous caustic solution alternately coalesces and disperses within the gasoline stream as it flows down the zigzag tube. The downwardly flowing aqueous caustic finally emerges from the contacting zone and collects in settling zone 25 in the lower portion of the column. The spent caustic may thereafter be withdrawn from the column through outlet conduit 26, the rate of withdrawal being controlled by valve 27 and flow responsive control 28. The treated gasoline emerging from the top of the contacting section accumulates in settling zone 29 and may be withdrawn therefrom through outlet conduit 30. It is contemplated that the temperature at which contacting is carried out and the relative volumes of aqueous caustic and untreated gasoline employed will be those heretofore conventionally used.

While the treatment of gasoline with aqueous caustic solution is representative of the contacting which may be carried out utilizing the present apparatus, numerous other liquid streams, as well as gaseous streams, may be effectively admixed with the apparatus of this invention. Furthermore, it is contemplated that more than two streams may be so inter-mixed and that, if desired, a plurality of fluid streams may be introduced along intermediate points of the course of zigzag flow. It will be further understood that the zigzag tubes may be of any geometrical cross-sectional area and that such cross-sectional area of the individual tubes will be sufficiently small to materially increase the contacting efficiency of the counter-currently flowing fluids because of the constriction of its area. The cross-sectional area of the tubes will thus vary, depending upon the nature of fluid to be passed therethrough. Accordingly, no definite size limitations can be placed upon the cross-section of the individual tubes but the optimum efficiency of contact may be readily determined by testing the efficiency of single tubes of different cross-sectional areas when utilizing the fluids to be employed. As a practical matter, the cross-sectional areas of the individual tubes will generally be within a range of about ¼" and about 3". Thus, for the treatment of gasoline with aqueous caustic solution as described above, tubes having a cross-sectional area of about 2" in diameter afford an effective contacting section.

It will be further understood that the flow rate of fluid introduced into the tubes and the rate of passage of fluid through the zigzag tubes is substantially uniform so that the fluid entering or leaving an individual tube is substantially uniform in quantity and composition as fluid entering or leaving any other of the tubes. Each of the zigzag tubes will be of substantially uniform dimensions and such uniformity is advantageous in the installation and machining of the tubes. The use of metering devices 17 and 22 serves to adjust the feed rate to each of the individual pipes 13 and 23 so that the rate of flow of fluid through each of these pipes is substantially identical.

It will further be understood that an important feature of the apparatus of this invention is the serrated extensions positioned at each of the angle bends of the zigzag tubes. Such serrations extend into the interior of the tube a substantial distance to effect the desired inter-dispersion of fluids passing therethrough but not to such an extent as to effect closure of the tubes. The nature and projection of the serrations, accordingly, is such as to afford an effective zone of contact. This may be more readily understood from the detailed view of Figure 2 wherein one zone of contact is particularly shown. Referring to this figure, it will be seen that downflowing fluid flows along the lower surface of the zigzag tube until it encounters a serrated extension. There, dispersion takes place and the downflowing fluid falls in the form of small dispersed particles through a zone of the counter-current rising fluid. The dispersed downflowing fluid thereafter coalesces and resumes its path of flow until it comes in contact with another serrated extension. The alternate coalescence and dispersion of one fluid in counter-current flow relationship with a second fluid thus provides an intimate degree of admixture between the contacting fluids. The number of serrated extensions will be dependent upon the length of each of the individual zigzag tubes which, in turn, will depend upon the desired height of the column. In choosing such height, consideration will be given to the number of individual contacts which it is desired that the counter-flowing fluids should make and also on the particular nature of the fluids undergoing treatment.

It is to be understood that the above description is merely illustrative of preferred embodiments of the invention, of which many variations may be made within the scope of the following claims by those skilled in the art without departing from the spirit thereof.

I claim:

1. An apparatus for effecting intimate counter-current contact of fluids comprising a wall defining a hollow elongated column, a plurality of zigzag tubes vertically arranged in said column, the individual cross-sectional area of each of said tubes being appreciably less than the cross-sectional area of said column, a plurality of serrated extensions positioned at alternate angle bends of said tubes in staggered relationship and jutting into the interior of said tubes a substantial distance to effect inter-dispersion of fluids passing therethrough but not to such an extent as to effect closure of said tubes, means for introducing fluid streams respectively into the upper and lower ends of said tubes, metering means for controlling the rate of fluid flow through the individual tubes and outlet conduits piercing the top and bottom of said column for effecting removal of fluids therefrom, whereby intimate admixture of counter-currently flowing fluids is attained as a result of the zigzag path of said fluids through said tubes and the inter-dispersion thereof during passage over said serrated extensions.

2. An apparatus for effecting intimate counter-current contact of fluids comprising a wall defining a hollow elongated column, a plurality of zigzag tubes vertically arranged in said column, the individual cross-sectional area of each of said tubes being appreciably less than the cross-sectional area of said column, a plurality of serrated extensions in staggered relationship jutting into the interior of each of said tubes at alternate angle bends thereof, said serrated extensions having the same degree of slope as the tube wall of which they constitute extensions, inlets extending into the upper portion of said tubes for feeding a fluid thereto, inlets extending into the lower portion of said tubes for feeding a second fluid thereto, metering means affixed to each of the aforesaid inlets for adjusting fluid feed rate to the individual tubes, walls defining settling zones respectively underlying and overlying said tubes and outlet conduits piercing said walls for effecting the withdrawal of fluid from settling zones.

3. An apparatus for contacting counter-flowing liquids comprising a wall defining a hollow elongated column, a plurality of zigzag tubes vertically arranged in said column, the individual cross-sectional area of each of said tubes being appreciably less than the cross-sectional area of said column, a plurality of serrated extensions positioned in staggered relationship at each of alternate angle bends of said tubes and jutting into the interior of said tubes, inlets extending into each of said tubes for the introduction of liquid streams respectively into the upper and lower ends of said tubes, metering means affixed to each of the aforesaid inlets for adjusting liquid feed rate to the individual tubes, walls defining settling zones respectively underlying and overlying said tubes and outlet conduits piercing said walls for effecting the withdrawal of liquid from said settling zones, whereby intimate admixture of counter-currently flowing liquids is attained as a result of the zigzag path of said liquids through said tubes and the inter-dispersion thereof during counter-passage over said serrated extensions.

References Cited in the file of this patent

UNITED STATES PATENTS

| Number | Name | Date |
|---|---|---|
| 943,422 | Knoepfel | Dec. 14, 1909 |
| 2,077,427 | Lissman | Apr. 20, 1937 |
| 2,573,491 | Richardson | Oct. 30, 1951 |
| 2,583,390 | Paasche | Jan. 22, 1952 |

FOREIGN PATENTS

| Number | Country | Date |
|---|---|---|
| 396,489 | Great Britain | Aug. 10, 1933 |
| 415,581 | Great Britain | Aug. 30, 1934 |
| 684,870 | Germany | Nov. 16, 1939 |